Patented Nov. 27, 1923.

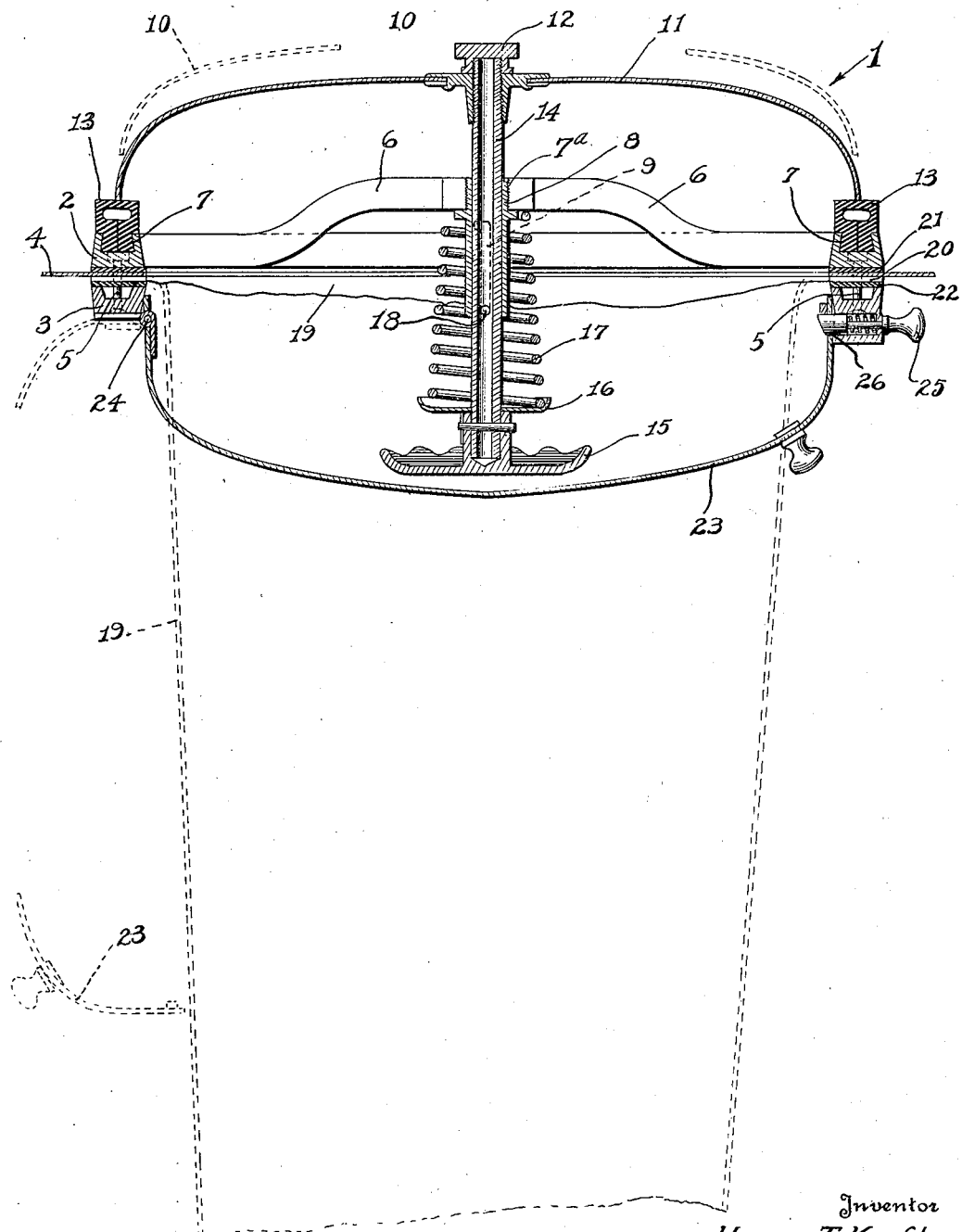

1,475,304

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

INFLATING MECHANISM FOR AIRCRAFT.

Application filed September 23, 1920. Serial No. 412,122.

*To all whom it may concern:*

Be it known that I, HERMAN T. KRAFT, a citizen of the United States, residing at Akron, in the county of Summit and State of Ohio, have invented new and useful Improvements in Inflating Mechanism for Aircraft, of which the following is a specification.

My invention relates to inflation devices for aircraft, such as dirigible balloons and the like, and it has for its primary object the provision of an inflation mechanism which shall provide a gas tight seal for the gas bag, and which shall insure a minimum expenditure of time and effort in preparing the balloon for inflation.

Other important objects of my invention will be apparent from the following detailed description of the accompanying drawings, in which the single figure is a sectional view of an inflation mechanism constructed in accordance with my invention.

In practicing my invention I employ the usual inflation tube in conjunction with a valve mechanism which insures a gas tight seal after the balloon has been inflated. The valve mechanism comprises broadly, a plurality of annular members secured around the opening of the inflation tube, and one of which is provided with a valve seat. The inner annular member is also provided with a spider or frame in which is mounted a valve member adapted to seat upon the annular member.

Resilient means, such as a spring, is employed to maintain the valve member in closed position, and means is also provided whereby the valve member may be lifted from its seat and held open during the inflating operation.

In order to insure a clear understanding of my invention, reference may be had to the accompanying drawing in which 1 is a valve inflating mechanism comprising a plurality of annular members 2 and 3 secured upon opposite sides of a gas bag 4 by means of bolts 5 arranged at intervals around the members. The inner member 2 is formed with a spider or frame 6 and is provided with a channel 7, which is employed as a valve seat. The frame 6 is provided with a central opening 7ª, having threaded walls, into which a sleeve 8, provided with an L shaped slot 9, is secured. A valve member 10, comprising a metallic diaphragm or body portion 11 secured to a central cap member 12, has a hollow yielding rubber edge member 13 secured to the diaphragm 11. The rubber portion 13 is adapted to seat within the channel 7 of the annular member 2, and the valve member 10 is maintained in proper position by a tubular member 14, which is suitably secured to the cap 12.

The tubular member is extended through the slotted sleeve 8, and has a handle 15 secured to its lower end. The handle 15 supports a cup member 16 which forms a seat for a spring 17, which is disposed about the sleeve 8 and in engagement with a frame 6. It will be apparent from the foregoing description that the spring 17 tends to maintain the valve member 10 in a closed position with the rubber portion 13 firmly seated in the channel 7 of the annular member 2.

In order to provide means for opening the valve, a pin 18 is rigidly secured to the tubular member 14 and extended through the L shaped opening 9 provided in the sleeve 8.

It will be apparent that in order to unseat the valve member 10 it is merely necessary to grasp the handle 15 and exert a pressure to compress the spring 17 to a sufficient degree to permit the pin 18 to enter the offset portion of the slot 9. The handle may then be released and the valve member 10 will remain in an unseated position by reason of the engagement of the pin 18 in the offset portion of the slot 9.

The usual inflation tube 19, a portion of which is shown in full lines, and in its lowered position in broken lines, is employed in conjunction with the above described valve mechanism. The tubular inflation member 19 may be formed as a part of the balloon fabric, or a separate tubular member may be employed which is clamped between the annular members 2 and 3, as indicated at 20. The annular members 2 and 3 also have a plurality of gaskets 21 and 22 interposed between them to insure a gas tight seal. It is, of course, apparent that it is desirable to provide means for carrying the inflation tube 19 when it is not in operation and to this end I have provided a cover or casing 23. The cover 23 is secured to the annular member 2 at one side by a hinge connection, as indicated at 24, and at a diametrically opposite side by means of a spring pressed handle 25, which extends through an opening 26 provided in the cover 23. The broken lines indicate the position of the cover 23 when the handle 25 is withdrawn from the opening 26, which permits the cover to drop. The cover 23 carries the inflation tube 19 when it is not in operation.

It will be clear that in order to unseat the valve member 10, the handle 15 is grasped by gathering the fabric tube 19 together to permit grasping the handle 15, after which the valve member is unseated as above described. After the balloon has been properly inflated the valve is closed and the tube 19 is gathered into the cover 23, which is closed and presents a low wind resistance when in such position.

Although I have shown and specifically described an inflation mechanism which is constructed in accordance with my invention, and applied to a dirigible balloon, it is obvious that minor changes may be made in the construction thereof, and in the manner of applying it to aircraft, without departing from the spirit and scope of my invention, and I desire therefore that no limitations shall be imposed except such as are indicated in the appended claims.

What I claim is:

1. An inflation mechanism for aircraft comprising a valve-supporting frame provided with a central opening, a slotted sleeve mounted in the opening of the frame, a valve member seated upon the frame, a tubular member secured to the valve member slidably disposed within the sleeve, a pin secured to the tubular member extended through the slot in the sleeve, and a spring mounted about the sleeve to engage the frame, and operatively connected to the tubular member whereby the valve is maintained seated upon the frame.

2. The combination with an inflation tube of an aircraft, of a valve mounted in communication with the tube, means tending to always maintain the valve closed, manually operable means for maintaining it open, and means for enclosing the tube in an inoperative position.

3. The combination with an inflation tube of an aircraft, of a valve mounted in communication with the tube, means tending to always maintain the valve closed, manually operable means for maintaining it open, and means for enclosing the tube in an inoperative position, said means including a cover hinged to a valve member and secured in closed position by a manually operable latching mechanism.

In witness whereof, I have hereunto signed my name in the presence of two subscribing witnesses.

HERMAN T. KRAFT.

Witnesses:
L. M. HARTMAN,
J. E. KEATING.